US009922295B2

(12) United States Patent
Dill et al.

(10) Patent No.: US 9,922,295 B2
(45) Date of Patent: Mar. 20, 2018

(54) METHOD FOR EVOLVING SHARED TO-DO LISTS INTO BUSINESS PROCESSES

(75) Inventors: Stephen Dill, San Jose, CA (US); James Lin, Cupertino, CA (US); Thomas P. Moran, Palo Alto, CA (US); Barton Allen Smith, Campbell, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2393 days.

(21) Appl. No.: 12/016,150

(22) Filed: Jan. 17, 2008

(65) Prior Publication Data

US 2009/0187453 A1    Jul. 23, 2009

(51) Int. Cl.
*G06Q 10/00*   (2012.01)
*G06Q 10/06*   (2012.01)

(52) U.S. Cl.
CPC ......... *G06Q 10/06* (2013.01); *G06Q 10/0631* (2013.01); *G06Q 10/0633* (2013.01)

(58) Field of Classification Search
CPC .... G06Q 10/10; G06Q 40/02; G06Q 30/0601; G06Q 40/00; G06Q 30/04; G06Q 40/025; G06Q 10/06; G06Q 10/1057; G06Q 10/107; G06Q 20/04; G06Q 20/12; G06Q 20/389; G06Q 30/02; G06Q 50/184; G06Q 50/188; G06Q 10/087; G06Q 10/0875; G06Q 20/102; G06Q 30/00; G06Q 30/06; G06Q 30/0641; G06Q 40/04; G06Q 10/0633; G06Q 10/067; G06Q 10/06312; G06Q 10/06316; G06Q 10/103; G06Q 40/06; G06Q 40/08; G06Q 90/00; G06Q 10/06393; G06Q 50/01

USPC ........................................ 705/7.12, 7.27, 7.11
See application file for complete search history.

(56) References Cited

U.S. PATENT DOCUMENTS

| 5,774,661 | A  | * | 6/1998  | Chatterjee et al. ........... 709/203 |
|-----------|----|---|---------|--------------------------------------|
| 6,047,260 | A  |   | 4/2000  | Levinson                             |
| 6,308,163 | B1 | * | 10/2001 | Du et al. ...................... 705/7.25 |
| 6,865,566 | B2 | * | 3/2005  | Serrano-Morales ... G06N 5/022 706/45 |
| 6,868,413 | B1 | * | 3/2005  | Grindrod et al. ............... 706/59 |
| 7,047,535 | B2 | * | 5/2006  | Lee et al. ...................... 719/328 |
| 7,100,147 | B2 | * | 8/2006  | Miller et al. .................. 717/102 |
| 7,516,137 | B1 | * | 4/2009  | Earle ................. G06F 17/30893 705/348 |

(Continued)

FOREIGN PATENT DOCUMENTS

| WO | WO 2005033980 A1 | * | 10/2004 |                 |
|----|------------------|---|---------|-----------------|
| WO | WO 2005033980 A1 | * | 4/2005  | ....... G06F 17/30289 |

*Primary Examiner* — Jamie H Austin
(74) *Attorney, Agent, or Firm* — Shimokaji IP

(57) ABSTRACT

A method and apparatus for evolving a shared to-do list into a business process is disclosed. A business process includes one or more business steps and zero or more action rules related to the business steps. Members of a workgroup participate in the business process and are able to view, modify, add and delete business steps and action rules as needed. An action rule is comprised of one or more business actions and one or more events that trigger the actions to be executed. A computer program keeps track of the business steps, interprets the set of rules, and updates states of the business process, notifies the members and validates and accepts modifications by the members to the action rules of a business steps.

18 Claims, 10 Drawing Sheets

(56) References Cited

U.S. PATENT DOCUMENTS

| | | | |
|---|---|---|---|
| 7,574,483 B1* | 8/2009 | Alger et al. | 709/217 |
| 7,729,924 B2* | 6/2010 | Setya | 705/1.1 |
| 7,805,325 B2* | 9/2010 | Rits et al. | 705/7.26 |
| 8,347,295 B1* | 1/2013 | Robertson | G06Q 10/06 718/103 |
| 2002/0040312 A1* | 4/2002 | Dhar | A61J 9/00 705/7.26 |
| 2002/0055868 A1* | 5/2002 | Dusevic et al. | 705/9 |
| 2002/0138543 A1* | 9/2002 | Teng | G06F 21/41 718/102 |
| 2003/0090514 A1* | 5/2003 | Cole et al. | 345/744 |
| 2003/0149714 A1* | 8/2003 | Casati et al. | 709/100 |
| 2003/0158759 A1* | 8/2003 | Kannenberg | 705/4 |
| 2003/0191731 A1* | 10/2003 | Stewart et al. | 706/47 |
| 2004/0025048 A1* | 2/2004 | Porcari et al. | 713/200 |
| 2004/0078105 A1* | 4/2004 | Moon | G06Q 10/10 700/100 |
| 2004/0204947 A1* | 10/2004 | Li | G06Q 10/10 705/322 |
| 2004/0243266 A1* | 12/2004 | Mata et al. | 700/99 |
| 2005/0021540 A1* | 1/2005 | McKee | G06Q 10/10 |
| 2005/0076049 A1* | 4/2005 | Qubti | G06Q 10/06 |
| 2006/0092861 A1* | 5/2006 | Corday | H04L 41/0213 370/256 |
| 2006/0097036 A1* | 5/2006 | Koenigsman | G06Q 40/00 235/379 |
| 2006/0225032 A1* | 10/2006 | Klerk et al. | 717/105 |
| 2006/0259604 A1* | 11/2006 | Kotchavi et al. | 709/223 |
| 2007/0006190 A1* | 1/2007 | Surasinghe | 717/143 |
| 2007/0185754 A1 | 8/2007 | Schmidt | |
| 2008/0077530 A1* | 3/2008 | Banas et al. | 705/50 |
| 2008/0147453 A1* | 6/2008 | Kogan et al. | 705/7 |
| 2010/0161558 A1* | 6/2010 | Goldberg et al. | 707/639 |

\* cited by examiner

METHOD FOR EVOLVING SHARED TO-DO LISTS INTO BUSINESS PROCESSES

BACKGROUND OF THE INVENTION

The present invention relates generally to the field of business process automation and more specifically to methods and apparatus of evolving shared to-do lists into business processes.

Collaborative work requires execution of tasks by members of a workgroup and communication among the members. The collaborative tasks may be in the form of a shared list of to-do tasks. Shared lists of to-dos can be found in a variety of software programs, including Lotus Notes™ and Domino™, Lotus Connections™ (http://www.lotus.com/connections), Basecamp™ software program by 37signals® (http://www.basecamphq.com/), and Microsoft Outlook™ and Microsoft Exchange™, and Microsoft Windows SharePoint Services™ by Microsoft®. Typical capabilities of the prior art programs include assigning a to-do to somebody, setting a due date, and checking it as done: but it usually does not go beyond this. No email or other communication provision is available at the completion of a task. Each to-do item typically stands alone and cannot affect other to-dos, such as changing the deadline of one item if the deadline of another changes.

A prior art method for managing and sharing a business process among multiple users includes constructing a business process as a diagrammatic connection of several tasks. The connection thus establishes a workflow for the business process; such workflow, i.e., organization of business steps, is created before the business process is executed. The diagrammatic representation and execution may be achieved in authoring tools that represent the process in a commonly used programming language, such as the Business Process Execution Language (BPEL) available at (http://www.oasis-open.org/committees/wsbpel/). The workflow is created ahead of time by people who analyze the work to be done and design a workflow and is distributed "one way" from designers of the workflow to the users of the workflow. The workflow pre-determines the steps people will take, allowing little variation. This scheme lacks the flexibility to allow users to modify the workflow to adapt to specific work situations they encounter.

Bug tracking systems such as Bugzilla™ (http://www-.bugzilla.org/) are more sophisticated. In addition to being marked "done" or "not done", a bug or an issue in a bug tracking system can usually be in one of several states, such as "fixed", "invalid", or "won't fix", and there is a discussion thread associated with each item. The system e-mails any change in a bug's state to the people who submitted and were assigned to the bug, and some systems allow anyone to add themselves to the notification list. The bug tracking system can also e-mail a member of a project about any change in any bug in the whole project. However, there is little flexibility in customizing these notifications. However, no notification facility is available if a particular bug is marked "fixed" or when a bug is overdue.

Microsoft BizTalk (http://www.microsoft.com/biztalk/), a business process management server, allows the behavior of processes to be specified using either a general workflow language or through English-like rules, which state that something should happen when a certain event is detected. However, a programmer must define the vocabulary of the rules ahead of time to fit their particular application. Commercially available e-mail programs such as Microsoft Outlook (http://office.microsoft.com/outlook/) allow the user to specify rules for handling incoming mail, such as moving all messages from a particular person to a certain folder. The user interface for these rules tend to consist of a mixture of drop-down lists and text boxes, which makes it easy to create a rule but tedious to create many similar rules or copy and paste rules. An example of prior art programs is Lotus Quickr™.

One practical problem with following business processes is that users do not have opportunities to make real time changes. In addition, the prior art techniques require user to learn a new set of rules and do not allow flexibility to a user to create new rules for execution of tasks. A better approach is needed.

SUMMARY OF THE INVENTION

In one embodiment of the present invention, a method of evolving a shared list of tasks into a business process comprising establishing an action rule, wherein the action rule comprises at least one event and at least one business action; and if the at least one event occurs, taking the at least one business action; wherein the business process comprises at least one business step; and wherein the at least one business step has an associated state; the associated state having at least two state labels is disclosed.

In another embodiment of the present invention, a method of modifying rules of a business process is disclosed comprising the steps of accepting a proposed modification, parsing the proposed modification to determine its validity, and if the proposed modification is not valid, notifying an entity, if the proposed modification is valid, modifying a rule using the proposed modification, wherein the business process comprises a plurality of business steps and a plurality of business rule.

In still another embodiment of the present invention, a computer program product comprises a computer useable medium including a computer readable program, wherein the computer readable program when executed on a computer causes the computer to evolve a shared list to a business process is disclosed. The computer program product includes computer usable program code for establishing an action rule; computer usable program code for executing an action; computer usable program code for allowing modification of a business step during execution of an action; computer usable program code for assigning an action to a user and computer usable program code for storing the business process as a template.

Yet another embodiment of the present invention is a system for evolving a list of tasks to a business process is disclosed. The system comprises a server computer and at least one client computer communicatively connected to each other by a communications network; wherein the server computer is configured to execute a software program comprising a rules interpreters unit for accepting, validating and interpreting action rules of a business process, a communication unit for performing communication with an external entity, the communication including information related to execution of the business process, a user interface unit for accepting a text string for the action rules of a business process and a management interface unit for allowing management by a user; and wherein the client computer is configured to execute a software program for interpreting action rules of the business process.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims. As user herein, the terms "task", "business task" and "to-do" are used to convey the same meaning as the term "business step".

The present invention can be embodied in a product such as Lotus Connections™ that allows web-based collaboration among multiple users. Another exemplary embodiment is the Quickstep™ collaborative software published by International Business Machines (IBM®) Corporation.

In one aspect, the present invention provides a method and apparatus for creation of a list of shared To-Dos (or tasks or business steps) to a workgroup. Using the method of the present invention, participants in the workgroup can evolve—that is, incrementally change—that list into a more structured business process that helps coordinate the work of the people carrying out the activity. Furthermore, using the present invention, such evolving can be achieved at the same time as the business process is being executed.

Figure 1:
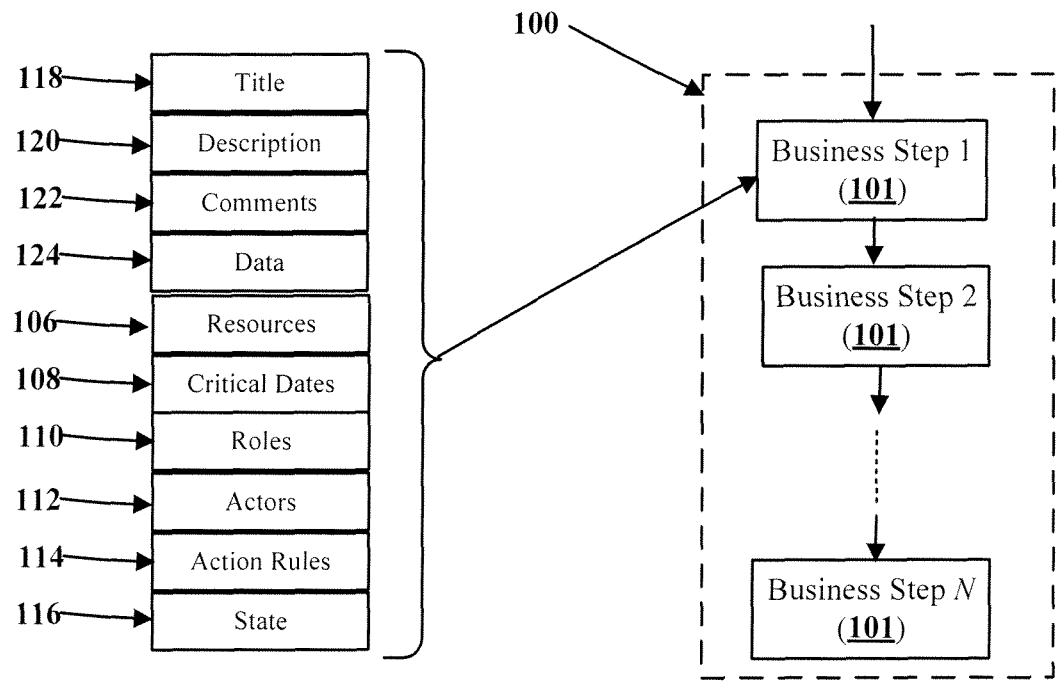
FIG. 1 is an illustration of a list of business steps organized in accordance with an embodiment of the present invention.
Figure 1:
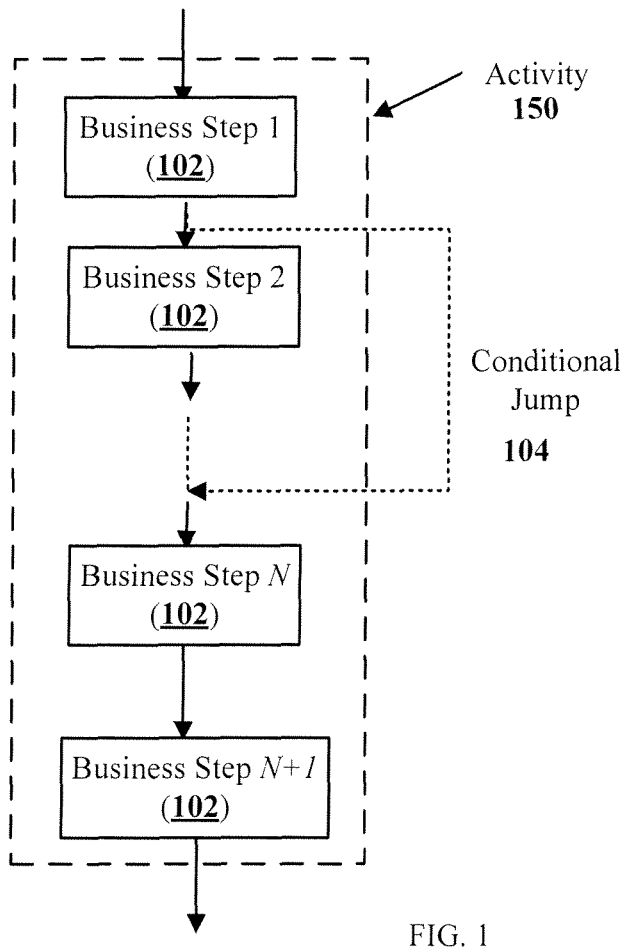

FIG. 1 shows an exemplary composition 100 of business steps 101, shown as business step 1, business step 2 . . . business step N that make up an exemplary business process. For example, "hiring a new employee" may be a business process 100 that requires several business steps 101 to accomplish it. Such a business process is represented as a template of business steps 101. An instance of a business process 100 applied to a particular business objective at hand is referred to as an activity, shown as block 150. For example, "hiring John Doe" may be an instance of this business process 100. The business steps 102 in activity 150 are initially copies of the business steps 101 in template 100. Activity 150 may be created by any person who has access to the template 100. The creator then becomes an actor 112 in activity 150, for example, assuming a role (such as manager) that may be specified in the template 100. Activity 150 may include activity-specific changes to business steps 102 beyond the template. For example, activity 150 shows addition of business step N+1 which is not in the specified business process 100. Similarly, activity 150 may include skipping over some steps, such as shown by conditional jump 104, during the course of its execution.

The execution of the activity 150 may proceed sequentially through the tasks 102 in order or may have conditional jumps, such as conditional jump 104, between tasks 102 in a different order, depending on the circumstances of the activity. Such conditional jumps may be based on results of actions performed during execution of a task 102. For example, as shown in FIG. 1, either Task 2 or Task N may be the next task performed after completion of Task 1. In general, an activity 150 may have multiple orders of execution among various tasks 102 that make up the task list for the activity 100. Each task 102 in the activity 150 can have various attributes associated with it. A task has a title 118. A task can have a textual description 120 and a sequence of comments 122 by the actors 112. Each task has a state 116, which has a value from a set of state labels, such as "started" or "done". Each task 102 can also include resources 106, critical dates 108, roles 110, people 112, and action rules 114 (rules). Resources 106 may be a conference room needed for the completion of the task or some other material resource (e.g., a tool or a document) required for completion of the task. Critical dates 108 may include a start date, an end date and any other critical intermediate date to reach a milestone; it may also include estimated duration of the task. Roles are entities to be filled by people (e.g., a manager role can be assigned to certain business steps; it may be unfilled or it may be filled by a particular actor Joe). Actors 112 may include the originator of the task and any other people participating in the activity, such as people allowed to read, write, modify or delete any of the tasks; people who should be notified upon completion or failure of a task. An actor is usually a person, but it can also be a computational agent (e.g., a program to add tasks to the activity). A task may also have data 124 associated with it (e.g., a task titled "assigned room" would have a "room number" datum to represent the room assignment). Action rules 114 may consist of event-action pairs and may be created by one or more actors 112.

Figure 2:
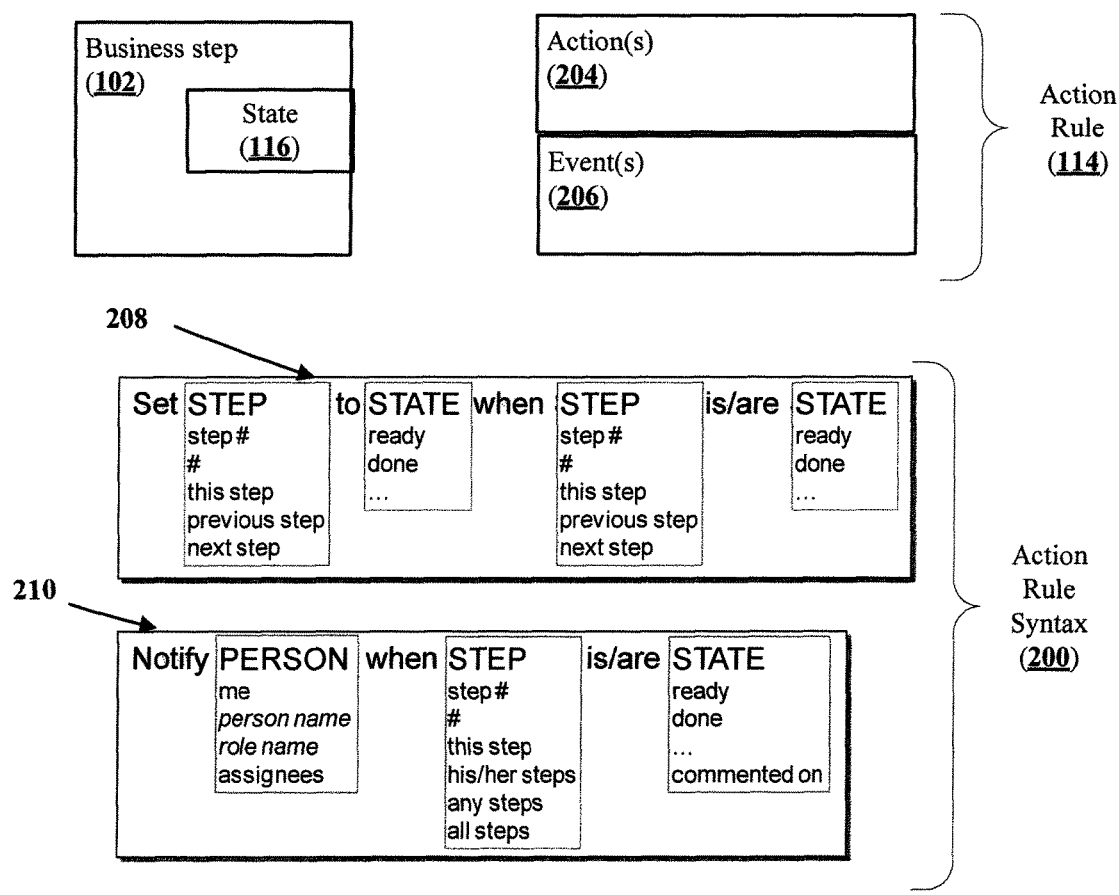
FIG. 2 illustrates a business step in the list of business steps and an action rule, in accordance with an embodiment of the present invention.

FIG. 2 shows exemplary business step 102 (a task) of an activity along with its state (block 116). In one exemplary embodiment, the state 116 of activity business step 102 can have a single value from a set of at least two state labels, such as "done", "ready", "upcoming", "started". Actors 112 can change state labels. Actors can also create new state-labels. Actors 112 can manually create and edit such an activity 150, e.g., add business steps 102, assign other actors 112 or roles to business steps 102, add deadlines 108, delete business steps 102, etc.

FIG. 2 further shows an exemplary action rule 114 and two action rule syntax examples 200 that can include one or more actions 204 and one or more events 206. In general, an action rule 114 may consist of a single event 206 and a single action 204. An event may be any change to any of the business steps of an activity. For example, when an actor changes the state of a business step to "done", this is represented by an event "business step becomes done".

Action rules 114 may trigger on events 206 in the business process 100. Other examples of events are "business step 4 becomes ready", "actor Joe is assigned to business step 2," "it is now one day before the deadline of business step 3" etc. When events 206 occur, the action rules 114 may specify that actions 204 are to be executed by the system. Actions 204 can be arbitrary procedures executed by the system, e.g., to change the state 116 of a business step 102, to notify a person 112 by email, to change a date 108, to change the order of the business steps, to add a new business step, or execute an operation on some business application, etc. Examples of actions rules 114 including notifying a specific person 112 when a business step 102 changes to a specific state 116 ("notify Tim when business step 4 is done"), changing the state 116 of a specific business step 102 ("change business step 4 to ready when business step 3 is done"), triggering business application workflows ("start the approval process in the travel-request system when business steps 3, 4, and 5 are done"), etc. Action rules 114 can also be more general, applying to many different business steps 102, such as "set next business step to ready when this business step is done", "notify Tim when any business step is started", etc. Thus action rules 114 can be the primary device by which participants of a workgroup can evolve a set of business steps 102 into a partially automated business process 100. Actions 204 that the rules 114 can execute may include but are not limited to: notifying someone through a mechanism such as e-mail or instant messaging, running an external program, posting a message to an external system, and changing the state 116 of a business step 102 or a set of business steps 102. One example action rule 114 is shown as block 208 and has syntax "set STEP to STATE when STEP is/are STATE". Another example action rule syntax is shown in 210 as "Notify PERSON when STEP is/are STATE".

Figure 3:
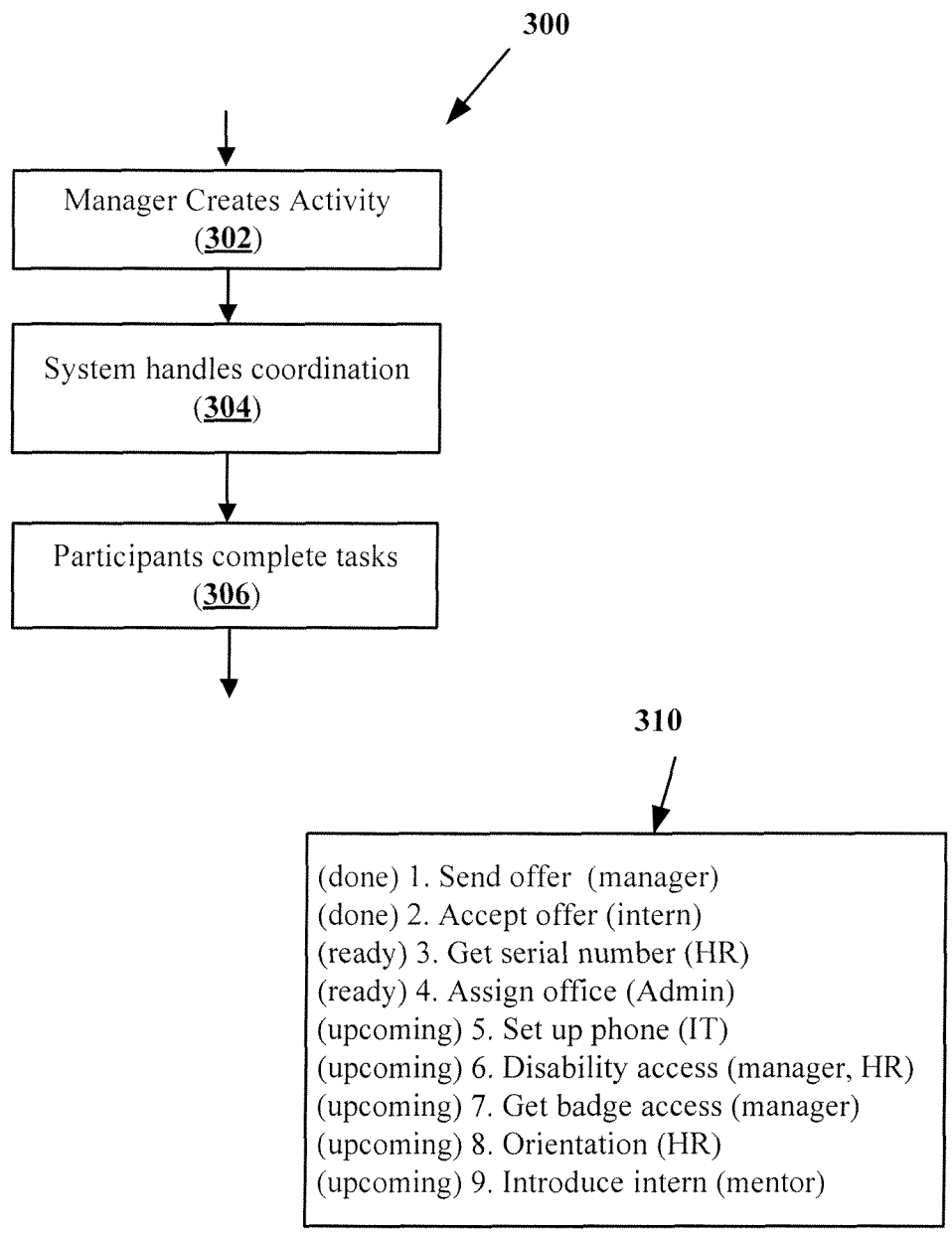
FIG. 3 is a flowchart showing business steps of implementation of an activity, in accordance with an embodiment of the present invention.

FIG. 3 shows a flowchart 300 illustrating an exemplary business process in which an intern is hired for employment by a company. The flowchart shows that the business process can be accomplished by coordination of business steps among various participants (actors) in the workgroup for the business process as follows. The participants in the workgroup of this example are: a manager, human resources (HR), information technology department (IT), an intern, an admin, and a mentor. In phase 302, the manager of the business process can create the activity of the business process, which in this case is hiring the intern. In the next phase 304, a software system may handle coordination of the activity using a method consistent with the specification. In the next phase 306, participants in the activity may complete their assigned tasks and update the list by marking their completion. List 310 shows an example of the business steps 102 comprising the activity 100 of hiring an intern. A total of nine (9) exemplary business steps 102 are shown. Each business step 102 can have a state 116 with some label (e.g., done, ready or upcoming), a title (e.g., "assign office") and an actor or role assignee 112 associated with it ("manager", "intern", John, etc.). An actor 112 may be able to modify the list of tasks 100 during the execution of the activity. For example, in business step 4 of list 310 (assign office business step), the actor (admin) may realize that the intern being hired requires handicap access. The actor 112 can then add to the list a new business step 6 (disability access). The actor 112 can also specify the participants who are to act on the newly added business step. The actor 112 can also specify who should be notified upon completion of the newly added business step.

Figure 4:
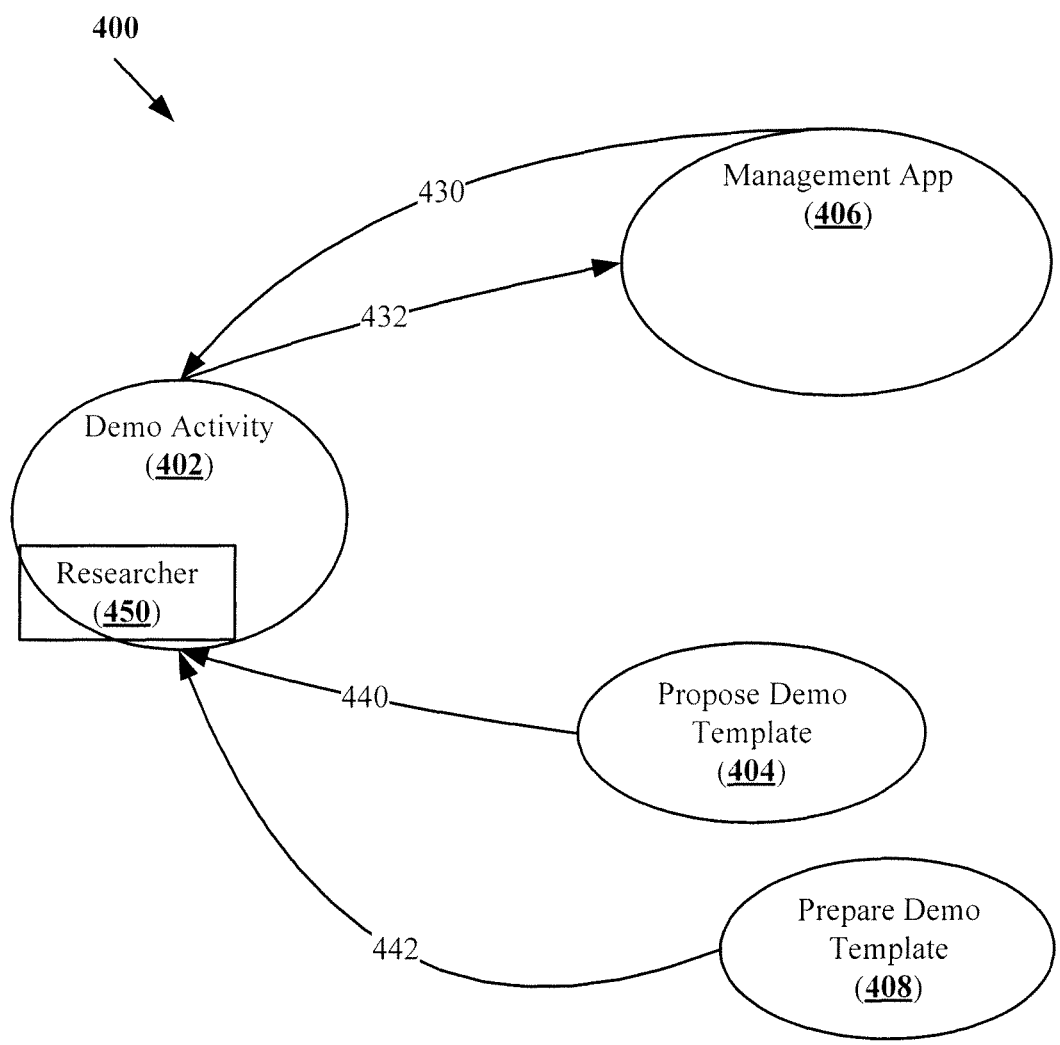
FIG. 4 illustrates various stages of creating and executing an activity and shows interactions with an external entity, in accordance with an embodiment of the present invention.

FIG. 4 shows an example 400 of interactions between an activity 150 and external entities. In FIG. 4, there is a business process 100 in the form of a template 404 providing steps 101 for "how to propose a demo for a meeting". A researcher 450 can make (shown as arrow 440) an activity instance 402 of this template 404. Activity 402 guides the researcher 450 in creating a proposed demo. When the researcher has completed the steps in activity 402, an action rule in 402 will trigger an action that transmits the proposal (shown as arrow 432) to a meeting management application 406. The meeting management application 406 may for example be a business process system which is an external entity to the demo activity 402. If the meeting management system 406 decides that the proposal is accepted, it will transmit (shown as arrow 430) information about acceptance to activity 402. Then an action rules 102114 in activity 402 will trigger an action 204 to notify the researcher 450 and another action 204 to copy (shown as arrow 442) new business steps from template 408 into activity 402 for the researcher 450 to follow. The modified rules may also be stored in the modified template 408 and may be used for future instantiations of a demo activity. The signal exchanges and interactions in FIG. 4 thus show how an activity 150 can communicate with an external entity, the external entity may itself be an activity or an actor, and how business process templates can be modified using interactions among activities and actors.

Figure 5:
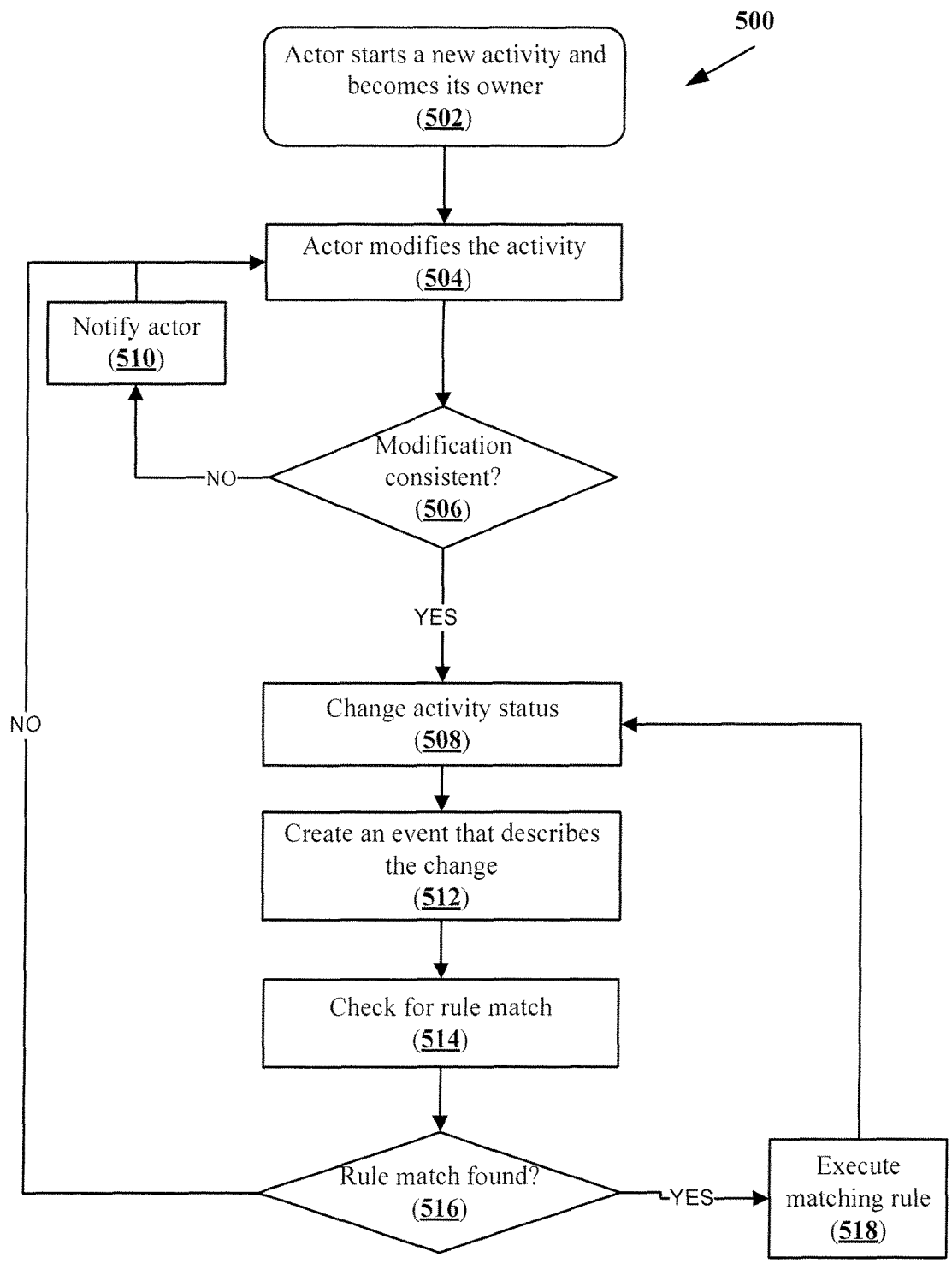
FIG. 5 is a flowchart illustrating the process of creation and modification of a list of activities in accordance with an embodiment of the present invention.

FIG. 5 shows a flowchart 500 of exemplary steps of activity lifecycle implemented in a computer program. In step 502, an actor 112 may start a new activity 100 and becomes its owner. In step 504, the actor owner 112 can propose to modify the activity 150. In step 504, the computer program will be accepting the proposed modification for further validation and processing. The modification, for example, may be done to meet the business requirements of the activity 100. Example modifications include, but are not limited to, adding new actors 112, adding new rules 110, adding new steps 102 in the activity 150, changing existing rules 110, and changing existing steps 200. When the modification is received by the computer program managing the activity 150, the computer program may check in step 506 if the proposed modification is consistent with other steps 102 of the activity 150. If the proposed modification is not consistent, then the computer program may reject the modification and notify the actor, in step 510, that the modification is inconsistent. If the modification is consistent, then the computer program may makes changes, in step 508, to the activity as instructed by the proposed modification. Making any change to an activity 150 may change that activity's status. Activity status is the collective representation of all of the attributes of all business steps 102 in the activity 150. The computer program can then proceeds to the next step 512 to create an event that describes the change. Next, in step 514, the computer program may check for a rule 114 match for the modified event. If a rule match is not found in step 516, the computer program may then go to the step 504 in which it can accept a next proposed modification from the actor 112. If a rule match is found in step 516, the computer program may then execute the matching rule in step 518. After completion of step 518, the computer program can then go back to step 508 in which it can then accept more changes the state of the activity 100.

Figure 6:
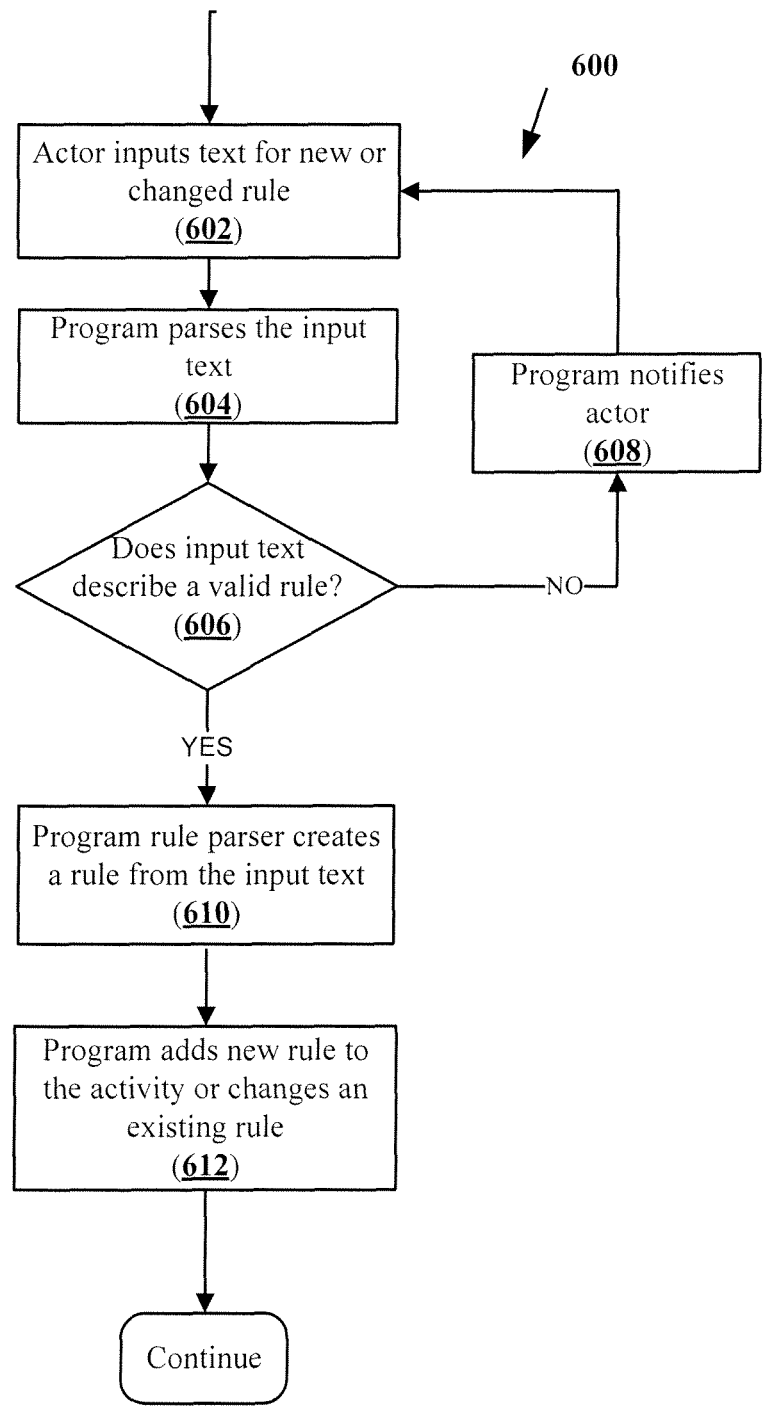
FIG. 6 is a flowchart illustrating the process of creation and modification of a rule in accordance with an embodiment of the present invention.

FIG. 6 shows a flowchart of exemplary steps implemented by the computer program if the actor changes an action rule 114 in step 504 in FIG. 5. In the first step 602, the actor may input text for a new or changed action rule 114. In the next step 604, the computer program may then parse the input text. The computer program can then make a determination in step 606 regarding validity of the entered text as a rule 114. If the entered text is not a valid action rule 114, the computer program may notify the actor 112, in step 608, that the entered text is not a valid rule. The actor 112 can then execute step 602 again and add or change action rules 114. If in step 606, the computer program determines that the entered text is a valid rule, the rule parser module of the computer program may then create an action rule 114 for execution, in step 610, from the entered text. In the next step 612, the computer program can then add the action rule 114 created in step 610 to the activity 100 or replace an existing rule 114 with the new rule 114.

The present invention lets users 112 create rules to specify coordination of behavior. The present invention lets a user specify rules using text string that is readable and understandable to a human. As previously shown in FIG. 2, an action rule 114 may comprise an action 204 and an event 206. Exemplary rule formats possible include a rule such as "Set BUSINESS STEP A to STATE Y when BUSINESS STEP B is STATE Z1" or "Notify PERSON X when BUSINESS STEP C is in STATE Z2" or "notify PERSON Z when BUSINESS STEP D is commented on" or "Set BUSINESS STEP E to STATE XX when DATUM DD is filled". The former rule may provide instruction to a computer program to set the state 116 of a business step 102 to a value "Y" when a state 116 of another business step 102 equals another value "Z1". The latter rule may provide instruction to the computer program to notify an actor X when a business step 102 reaches a state label Z2. The plain text nature of the rules makes it easier for a user to input such rules in a text string format, without having to memorize complex instruction sets. Other prior art exists that also allow end-users to specify rules.

Figure 7:
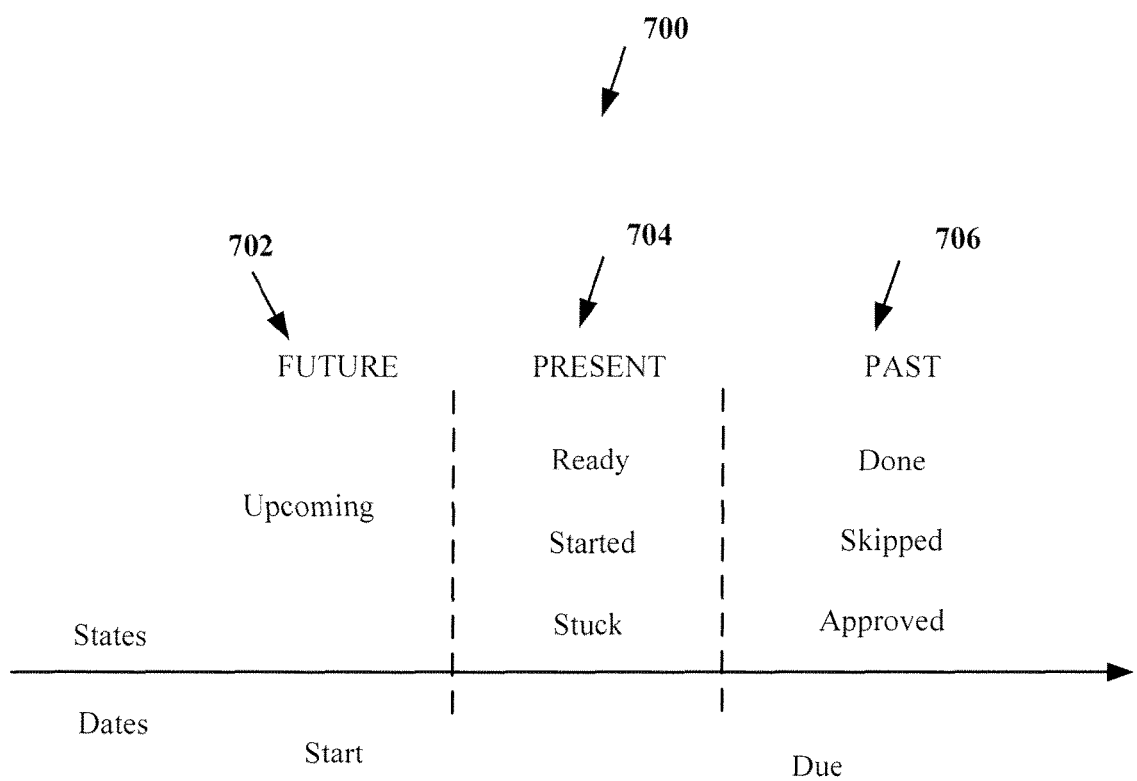
FIG. 7 is an illustration of an exemplary set of state labels that are referred to by action rules, in accordance with an embodiment of the present invention.

FIG. 7 shows an exemplary set of state labels 700. These labels are possible values of a business step's state 116. The rule parse module may use in making a decision in step 610 regarding validity of the entered text as a rule 114, would check that the input text uses one of the allowed state labels. The set of state labels may be classified into three possible time epochs—future time 702, present time 704, or past time 706. The state labels in the future epoch 702 may include "upcoming" to signify that a business step 102 is not expected to be executed until some time in the future. The present epoch 704 may comprise a "ready" label, indicating that a business step 102 is ready for execution; a "started" label, indicating that a business step 102 is currently being executed; and a "stuck" label, indicating that an actor 112 had some problems with successful completion of a business step 102. The past epoch 706 may include the following state labels 116: a "done" label indicating that the business step 102 has been completed; a "skipped" label indicating that a business step 102 was skipped due to some reason; and an "approved" label indicating that an actor has approved the execution of a business step 102. A business step 102 also may have associated dates 108, such as a start date and a due date that shows the chronological constraints on the business step within the activity 150.

Figure 8:
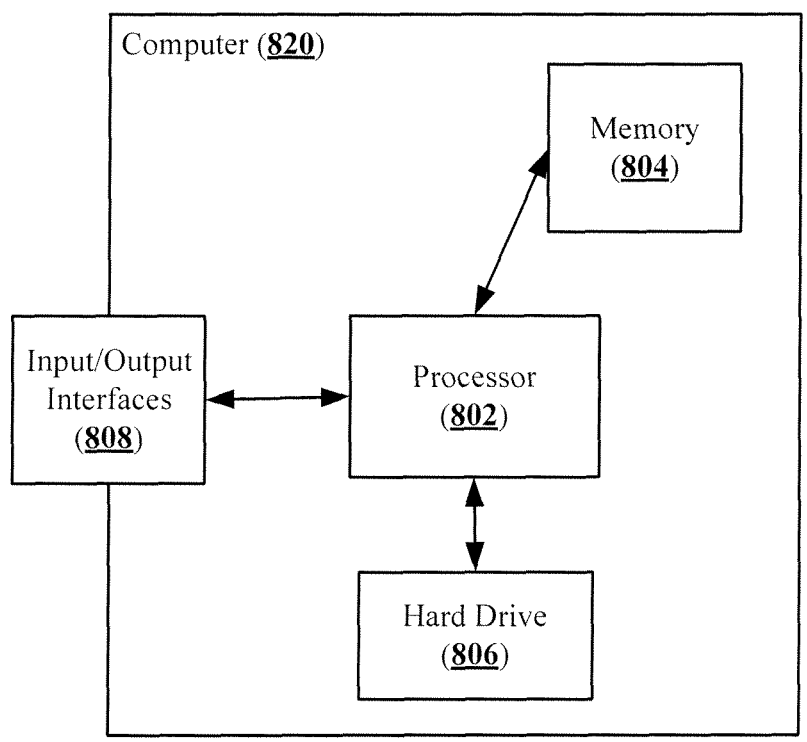
FIG. 8 is a block diagram illustrating a computer apparatus in accordance with an embodiment of the present invention.

FIG. 8 shows a computer platform 820 on which the computer program embodiment of the present invention can be implemented. The computer platform 820 may comprise a processor 802, a memory unit 804 that includes memory for data and instructions, a hard drive 806, and an interface 808 for input/output communication with other computers or equipment.

Figure 9:
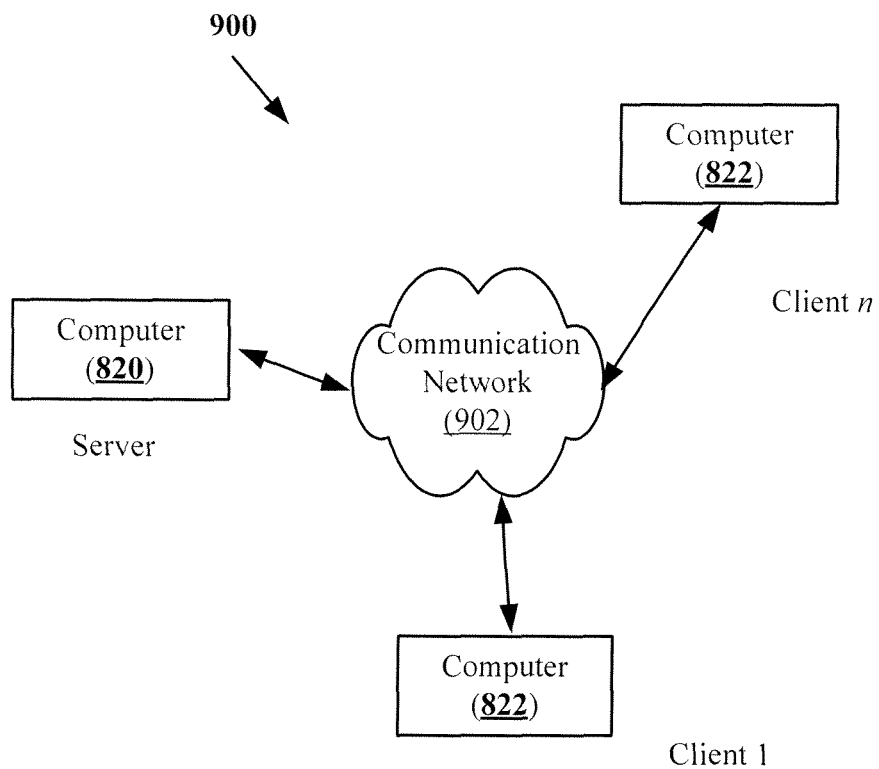
FIG. 9 is a block diagram of a network in accordance with an embodiment of the present invention can be implemented.

FIG. 9 shows an exemplary system 900 where the present invention can be implemented. The system 900 may comprise one or more computers, one of which may be configured to act as a server 820, and one or more of which may be configured to act as a client 822. The computers 820 and 822 are in turn communicatively coupled to each other using a communication network 902 such as the Internet.

Figure 10:
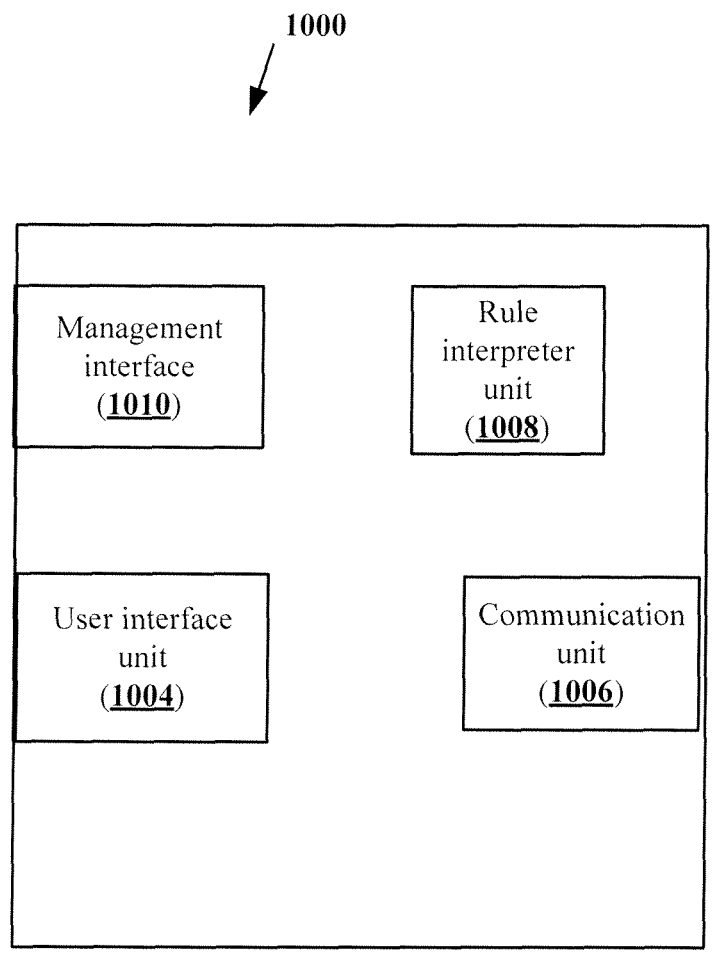
FIG. 10 shows a software stack showing exemplary functional blocks of an embodiment of the present invention.

FIG. 10 shows exemplary software protocol stack of a server software program run on a computer 820 in accordance with an embodiment of the present invention. The software stack may additionally comprise other functional blocks generally available with industry standard operating systems such as Linux™, MacOS™ and Windows™. For simplicity of description, only some functional blocks relevant to an embodiment of the present invention are shown. A user interface unit 1004 can be used to accept input from a user regarding addition, deletion and modification of business steps 102 of an activity 100 that is run on the computer 820. A communication unit 1006 may be used for communication with external entities, such as other users and computers. The communication can include sending emails to other users 112, sending instant messages, notifying users, checking for updates to the execution of a module in the software stack 1000 and so on. A rules interpreter unit 1008 may accept the proposed rules 114 from a user and check for validity of the rules. The rules interpreter unit 1008 may also perform the task of creating or executing computer code by interpreting the action rules 114 provided by a user. For example, the rules interpreter unit 1008 may be implemented as a web browser plug-in software module written in a programming language such as JavaScript™. The software stack 1000 may also contain a management interface 1010 that allows management and control tasks such as allowing a manager user to manage execution of an activity 100 and allowing a programmer to update the rules interpreter unit 1008. The software stack of a client software program may share many of the same functional blocks described for the server software program. In particular, it may be advantageous to configure client software program with a web browser plug-in that interprets the rules 114 of a business process 100. Such a configuration allows embodiment of the present invention ubiquitously on any commercially available software/hardware platform enabled with a web browser.

The present invention envisions that a variety of events for triggering action rules 114 are possible. The events include, but are not limited to, whether the state 116 of a business step 102 or set of business steps 102 is changed; or whether a user 112 adds a comment to a business step 102; or whether a set of business steps 102 are within a certain period of time of the start or due date 108 of a business step 102; or if a person 112 is added to or removed from the process; or if a person 112 is assigned or unassigned to a role 110; or if a message is received from an external business process or within a certain period of time of a particular change in the process.

An embodiment of the present invention is a prototype called Quickstep™. Quickstep™ represents a business activity 150 as a list of business steps 102 for people 112 to do. This list 100 can represent an ordered set of business steps 102, an unordered collection of to-dos, or a mixture thereof. Each business step's state 116 can one of several state labels 700, such as "upcoming", "ready", or "done," along with start and due dates. Along with the business steps 150, a business process 100 may also have a list of actors 112 involved in the business process 150, a list of the roles 110 these actors 112 play in the process, and a list of resources 106 (such as web links, documents, scripts, connections to external applications, or messages).

Quickstep™ also allows actors 112 to automate certain behaviors of the activity 150 by adding action rules 114. For example, a manager 112 may want to be notified by e-mail whenever a business step 102 assigned to one of his employees is completed, without needing to check the list 150 itself. Another possibility is setting the state 116 of a business step 102 to "ready" whenever another business step 102 becomes "done." To specify such behaviors, the business process 150 can include a set of rules 114 that act upon the business process 100. Each rule 114 may consist of two parts as shown in FIG. 2: an action 204 and an event 206 that must occur for the action to be executed. Here are some examples of Quickstep™ rules: "Notify me when the state of step 3 becomes ready" or "Notify Bob when the Approve Proposal step becomes done" or "Change the state of step 6 to ready when the state of step 5 is done" or "Notify Mary 3 days before step 10 is due."

A rule 114 can react to any change in the business activity 150, and as a result create a notification or further change the process 100 and the notification may then be communicated to an external entity such as a human user or a software agent.

Quickstep™ implementation to support rules 114 may consist of two parts: parsing the rules 114 and executing them. The rule parser may take the English sentence that the user types in and parse it into an internal representation that is stored, so that the rule's condition can be checked and its action 204 can be executed without needing to reparse it every time.

For execution of a rule 114, Quickstep™ can use an event-based architecture. Rules 114 may set up event listeners to listen for events from the Quickstep™ system, such as the state 116 of a business step 200 has changed or the due date for a business step is 3 days away. When the system fires an event, each rule 114 may receive the event and check to see if its condition matches the event. If so, the rule 114 can perform its action, which may result in the system firing more events.

To further customize the behavior of the process, users 112 can augment the possible state labels 700 with their own and then define rules that are executed depending on those labels 700. For example, a user 112 can define an "approval-needed" label, and then a rule that says, "Notify Bob when any step becomes approval-needed."

To enter a rule 114, a simple text box can be used. Such a user interface is fast for users 112 to enter rules 114—they do not need to fiddle with drop-down boxes and other widgets that can slow them down. It also makes it easy for users 112 to cut and copy rules 114, and paste them into other processes. However, without further guidance, it is harder for the user 112 to remember the syntax of the rules. Techniques such as a step-by-step wizard, auto-complete as found in integrated development environments (IDEs), and dragging and dropping from a palette of rule parts, can be used to ease the burden of remembering the rules' syntax. More sophisticated parsing techniques, such as sloppy parsing in Koala/CoScripter, can also be used so that Quickstep™ would be able to tolerate more variation in what a user 112 types in.

Quickstep™ is set up so that changes to any part of the process 100, including the rules 114, can immediately go into effect. This allows the process 100 to evolve incrementally, without needing to stop and restart a process server 820. Since the threshold to changing a process 100 is lower, it is more likely to change and evolve as the underlying work practices also evolve.

At the same time, any behavior in a Quickstep™ process 100 can be overridden by the user 112. For example, the typical lifecycle of a business step 200 may start in the "upcoming" state, and then go through the "ready", "started", and "done" states. While a prior art workflow application typically enforces such transitions, in Quickstep™ a user can go straight from "upcoming" to "done."

The present invention can be implemented using client/server architecture as shown in FIG. 8 wherein client devices 822 are used to interact with the process database on a server device 820.

Alternatively, a web-based embodiment is also possible. A user can use an off-the-shelf web browser and see or modify content on a central database through a web-based connection to a server 820.

The invention can take the form of an entirely hardware embodiment, an entirely software embodiment or an embodiment containing both hardware and software elements. In an exemplary embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

It should be understood, of course, that the foregoing relates to exemplary embodiments of the invention and that modifications may be made without departing from the spirit and scope of the invention as set forth in the following claims.

We claim:

1. A system for evolving a list of tasks to a business process, the system comprising:
   a server computer and at least one client computer; the server computer and the at least one client computer communicatively connected to each other by a communications network, wherein the client computer is configured to execute a client software program for interpreting action rules of the business process;

a rules interpreter unit on the server computer configured to accept, validate, parse, and interpret the action rules of the business process, wherein the server computer creates and executes computer code in response to the rules interpreter unit interpreting the action rules;

a parsed action rule storage unit configured to store the parsed action rules of the business process as a template;

a user interface unit including a computer display on the client computer, and including electronic hardware configured to perform drag and drop construction of one of the parsed action rules from a palette of rule parts displayed on the computer display;

a management interface unit on the client computer configured to allow management by a user of the business process, wherein a user modifies a label of a step in one of the action rules through the user interface on the client computer, and wherein the one of the action rules with the modified label is executed in response to a specified status of a label of a different step in the one of the action rules, and wherein the management interface unit is configured to add new steps to the template, and wherein the management interface unit is configured to create a first set of the parsed action rules by copying the newly added steps of the template into the first set of the parsed action rules based on input by the user and by input from a second set of the parsed action rules; and a modification unit on the server computer configured to add new users to the business process; and an execution unit configured to execute the parsed action rules in the parsed action rule storage unit, a selected one of the parsed action rules being conditionally executed based on a result of one of the executed parsed action rules.

2. The system of claim 1 wherein the client software program comprises a plug-in software module for a web browser.

3. The system of claim 1, wherein the action rules comprise at least one event and at least one business action; and if the at least one event occurs, taking the at least one business action;

wherein the business process comprises at least one business step; and wherein the at least one business step has an associated state; the associated state having at least two state labels.

4. The system of claim 3 wherein the step of taking the at least one business action includes changing at least one of the at least two state label values of the at least one business step; the at least two state label values comprising "done" and "not done".

5. The system of claim 3 wherein the step of taking the at least one business action includes notifying an entity.

6. The system of claim 3 wherein the step of taking the at least one business action includes changing a date related to the business process.

7. The system of claim 3 further comprising allowing for addition of at least one business step to the business process while the business process is being executed.

8. The system of claim 3 further comprising the step of allowing deletion or modification of the at least one business step while the business process is being executed, wherein the modification of the at least one business step is executed if there is a match of the modification of the at least one business step to one of the action rules of the business process.

9. The system of claim 3 further including the step of adding a new associated state label to the at least one business step.

10. A computer program product including a computer useable medium stored on a non-transitory computer usable medium, including a server computer connected to at least one client computer over a communication network, said computer program product comprising:

computer usable program code on the server computer that accepts, validates, and interprets action rules regarding tasks of a business process, wherein the action rules of the business process are constructed using electronic hardware configured to perform drag and drop construction of one of the action rules from a palette of rule parts displayed on a computer display, and the action rules of the business process are stored as a template, wherein the server computer creates and executes computer code in response to the server computer interpreting the action rules of the business process;

computer usable program code on the server computer that verifies whether the addition of steps to the business process and whether modification of existing steps for the business process is consistent with the existing steps for the business process computer usable program code on the server computer that adds steps to the business process and changes the existing steps for the business process, wherein the action rules of the business process automatically change upon a change in business activity of the business process;

computer usable program code that creates a modified template from the changed action rules and from input from a set of action rules other than the changed action rules;

computer usable program code on the server computer that perform communication with an external entity; said communication including information related to execution of the business process;

computer usable program code that allows management by a user of the business process, wherein the user changes one of the action rules of the business process in the template and the modified template using a computer display on the at least one client computer without stopping and restarting the server computer; and computer usable program code that skips a partial portion of one of the action rules, wherein a partial portion is less than all of one of the action rules; and computer usable program code that executes the action rules other than the skipped partial portion of one of the action rules.

11. The computer program product of claim 10 including a client software program that comprises a plug-in software module for a web browser.

12. The computer program product of claim 10, wherein the action rules comprise at least one event and at least one business action; and if the at least one event occurs, taking the at least one business action;

wherein the business process comprises at least one business step; and wherein the at least one business step has an associated state; the associated state having at least two state labels.

13. The computer program product of claim 12 wherein the step of taking the at least one business action includes changing at least one of the at least two state label values of the at least one business step; the at least two state label values comprising "done" and "not done".

14. The computer program product of claim 12 wherein the step of taking the at least one business action includes notifying an entity.

15. The computer program product of claim 12 wherein the step of taking the at least one business action includes changing a date related to the business process.

16. The computer program product of claim 12 further comprising allowing for addition of at least one business step to the business process while the business process is being executed.

17. The computer program product of claim 12 further comprising the step of allowing deletion or modification of the at least one business step while the business process is being executed,
   wherein the modification of the at least one business step is executed if there is a match of the modification of the at least one business step to one of the action rules of the business process.

18. The computer program product of claim 12 further including the step of adding a new associated state label to the at least one business step.

* * * * *